(12) United States Patent
Vallee et al.

(10) Patent No.: US 8,241,541 B2
(45) Date of Patent: Aug. 14, 2012

(54) CATHODE MATERIAL FOR POLYMER BATTERIES AND METHOD OF PREPARING SAME

(75) Inventors: Alain Vallee, Varennes (CA); Paul-Andre Lavoie, Montreal (CA); Patrick Leblanc, Boucherville (CA); Regis Gagnon, St-Jean-sur-le-Richelieu (CA); Fabrice Regisser, Varennes (CA); Dany Brouillette, Brossard (CA)

(73) Assignee: Bathium Canada Inc., Boucherville (CA)

( * ) Notice: Subject to any disclaimer, the term of this patent is extended or adjusted under 35 U.S.C. 154(b) by 0 days.

(21) Appl. No.: 11/836,575

(22) Filed: Aug. 9, 2007

(65) Prior Publication Data

US 2007/0273062 A1 Nov. 29, 2007

Related U.S. Application Data

(62) Division of application No. 10/902,174, filed on Jul. 30, 2004, now abandoned.

(60) Provisional application No. 60/491,532, filed on Aug. 1, 2003.

(51) Int. Cl.
  *C04B 35/00* (2006.01)
(52) U.S. Cl. ............... 264/118; 264/105; 429/231.95
(58) Field of Classification Search ............ 264/104, 264/143, 118; 429/310–320, 231.95
  See application file for complete search history.

(56) References Cited

U.S. PATENT DOCUMENTS

| | | | |
|---|---|---|---|
| 4,804,594 A * | 2/1989 | Jow et al. | 429/213 |
| 4,808,496 A * | 2/1989 | Hope et al. | 429/312 |
| 4,976,904 A | 12/1990 | Bilhorn | |
| 5,219,679 A * | 6/1993 | Abraham et al. | 429/310 |
| 5,232,962 A * | 8/1993 | Dershem et al. | 523/442 |
| 5,336,573 A * | 8/1994 | Zuckerbrod et al. | 429/252 |
| 5,474,435 A * | 12/1995 | Hunke | 425/71 |
| 5,498,372 A * | 3/1996 | Hedges | 252/511 |
| 5,536,278 A * | 7/1996 | St-Amant et al. | 29/623.3 |
| 5,593,462 A | 1/1997 | Gueguen et al. | |
| 5,749,927 A * | 5/1998 | Chern et al. | 29/623.5 |
| 5,772,930 A * | 6/1998 | Hashimoto et al. | 264/15 |
| 5,789,107 A * | 8/1998 | Okada et al. | 429/218.1 |
| 5,804,116 A | 9/1998 | Schmid et al. | |
| 6,200,707 B1 * | 3/2001 | Takada et al. | 429/304 |

(Continued)

FOREIGN PATENT DOCUMENTS

CA 2438177 8/2002

(Continued)

OTHER PUBLICATIONS

SparkNotes: Solubility, http://web.archive.org/web/20020224142149/http://www.sparknotes.com/chemistry/solutions/solubility/section1.html, retrieved Feb. 24, 2002.*

(Continued)

*Primary Examiner* — Jennifer Michener
*Assistant Examiner* — Magali P Slawski
(74) *Attorney, Agent, or Firm* — McMillan LLP

(57) ABSTRACT

The invention provides a pre-mix of positive electrode material in transportable solid form comprising polymer and solid particles of electrochemically active material and/or electronically conductive additives and a process for preparing a pre-mix positive electrode in transportable solid form. The pre-mix positive electrode material may also comprise an alkali metal salt either dissolved or dispersed in the mixture. The invention also provides making a cathode film from the transportable solid pre-mix of positive electrode material.

6 Claims, 1 Drawing Sheet

U.S. PATENT DOCUMENTS

| | | |
|---|---|---|
| 6,214,966 B1 | 4/2001 | Harris |
| 6,383,235 B1 * | 5/2002 | Maegawa et al. ............ 29/623.5 |
| 6,413,676 B1 * | 7/2002 | Munshi ........................ 429/306 |
| 6,673,273 B2 | 1/2004 | Le et al. |

FOREIGN PATENT DOCUMENTS

| | | |
|---|---|---|
| CA | 2410097 | 11/2002 |
| EP | 0756348 A1 | 1/1997 |
| EP | 766331 A1 * | 4/1997 |
| JP | 09223497 | 8/1997 |
| JP | 2000348710 | 12/2000 |
| JP | 2002343433 | 11/2002 |
| JP | 2003132877 | 5/2003 |
| WO | WO 0051806 | 9/2000 |

OTHER PUBLICATIONS

International Search Report of PCT/CA2004/001429, Nov. 26, 2004.
English abstract of JP 2000348710; Dec. 15, 2000.
English abstract of JP 2003132877; May 9, 2003.
English abstract of JP 2002343433; Nov. 29, 2002.
English abstract of JP 09223497; Aug. 26, 1997.

* cited by examiner

CATHODE MATERIAL FOR POLYMER BATTERIES AND METHOD OF PREPARING SAME

This application claims priority from and is a divisional of U.S. patent application Ser. No. 10/902,174 filed Jul. 30, 2004, the content of which is incorporated herein by reference.

FIELD OF INVENTION

The present invention relates generally to polymer batteries and more specifically to the preparation of cathode materials for polymer batteries.

BACKGROUND OF THE INVENTION

Lithium/polymer electrolyte batteries are manufactured by superposing three main types of films: a film of metallic lithium, a film of an electrolyte comprising a polymer and a lithium salt, and a film of a positive electrode. Each of these films has a thickness between 5 and 200 µm, for a total thickness of 100 to 300 µm for the elementary film of battery.

The film of positive electrode is typically prepared by coating or extrusion, on a support film or directly on an aluminium foil or metallized plastic film, used as an electrical current collector, a dispersion containing an electrochemically active material such as a transitional metal oxide, carbon black and/or graphite to ensure electronic conduction, a polymer-salt electrolyte to ensure ionic conduction and the mechanical bond between the solid particles mentioned above and most often appropriate solvent or solvent mixtures which are evaporated totally or partially during the coating process or extrusion process.

In the coating process, the mixing and blending of the electrochemically active material, the electronic conduction additives, the polymer binder and the lithium salt forming the positive electrode is done in a compatible solvent or solvent mixtures that will dissolve the salt and the polymer immediately prior to coating. The solution is then coated through a coating head in the form of a thin film. The solvent is then evaporated and recovered, usually by condensation, for obvious environmental reasons.

In the extrusion process, the mixing and blending of the electrochemically active material, the electronic conduction additives, the polymer binder and the lithium salt forming the positive electrode material is carried out by the screw or screws of the extruder itself. The polymer and lithium salt are generally introduced first in the extruder and melted followed by the introduction downstream from the polymer-salt melt of the electrochemically active material and the electronic conduction additives which are mixed and dispersed in the polymer-salt melt by the screw or screws of the extruder. Frequently, an appropriate solvent or solvent mixtures is added to reduce the viscosity of the melt and to help in the mixing of the solid particles of active material and electronic conduction additives, the solvent(s) which must be evaporated after the positive electrode material is extruded onto a support film, directly on a current collector or as a free-standing film. Preferably, a twin screw extruder is used for its superior ability over a single screw extruder for mixing and blending the various components of the positive electrode material.

However, even with a twin screw extruder, the mixing and blending of the various components of positive electrode material is sometime inadequate. Specifically, the solid particles (active material and electronic conduction additive particles) are not properly mixed and dispersed, resulting in a less homogenous positive electrode material resulting in poor electrochemical performance of the electrochemical cells. In addition, the use of a twin screw extruder involves high shear events which may potentially degrade the polymer thereby further decreasing the electrochemical performance of the cell during the cycles of charge and discharge.

Thus there is a need for a method or process of mixing and blending the various components of a positive electrode material to improve the dispersion and consistency of mixing of the solid particles as well as a positive electrode material with homogenous dispersion of its solid particles constituents.

STATEMENT OF THE INVENTION

It is therefore an object of the present invention to provide a method for mixing the various components of a positive electrode material having solid content for a polymer battery.

It is another object of the present invention to provide an improved positive electrode material having dispersed solid content for a lithium polymer battery.

As embodied and broadly described, the invention provides a pre-mix of positive electrode material in solid transportable form comprising a polymer and solid particles of electrochemically active material and preferably an electronic conductive additive. Preferably, the pre-mix of positive electrode material in solid transportable form comprises a polymer and at least 40% of solid particles of electrochemically active material and electronic conductive additives. Also preferably, the pre-mix of positive electrode material comprises a alkali metal salt either dissolved or dispersed in the polymer. Preferably, the pre-mix of positive electrode material is in the form of small to medium size chunks, pucks, carrots, stripes, etc. or in pellet, granule, powder or flake form. Preferably, the pre-mix of positive electrode material in solid transportable form comprises a polymer and between 40%/wt and 80%/wt of solid particles of electrochemically active material and electronic conductive additives. The polymer of the pre-mix of positive electrode material may contain a small amount of water within the range of 1000 ppm to 10,000 ppm.

The active material of the cathode may be selected from lithium cobalt/nickel oxide, lithium manganese oxide ($LiMn_2O_4$), layered lithium manganese nickel oxide and their derivatives, mixtures and analogs for so-called 4V cathodes or among cathodes discharging below 4V such as phosphates or other polyanions of transition metals such as $LiFePO_4$ and Nasicon structures, also including $V_2O_5$, and $Li_xV_3O_8$. The alkali metal salt(s) may be for example salts based on lithium trifluorosulfonimide (LiTFSi) as described in U.S. Pat. No. 4,505,997, $LIPF_6$, $LiBF_4$, $LiSO_3CF_3$, $LiClO_4$, and LiSCN, etc. and combinations thereof. The nature of the salt or of the active material is not a limitation of the present invention.

As embodied and broadly described, the invention also provides a process for preparing a pre-mix positive electrode in solid transportable form comprising the steps of:

(a) In a mixing device, mixing together a polymer, at least one solvent and solid particles of electrochemically active material to form a mixture of polymer-solid particles;

(b) evaporating the at least one solvent present in the mixture of polymer-solid particles; and (c) transforming the polymer-solid particles mixture into a transportable solid selected from the group consisting of chunks, pucks, carrots, stripes, pellets, granules, powder, flakes and combinations thereof.

As embodied and broadly described, the invention also provides for a process for preparing a pre-mix positive electrode in transportable solid form comprising the steps of:
(a) In a mixing device, mixing together a polymer, at least one solvent, an alkali metal salt and solid particles of electrochemically active material to form a mixture of polymer-salt-solid particles;
(b) evaporating the at least one solvent present in the mixture of polymer-salt-solid particles; and
(c) transforming the polymer-salt-solid particles mixture into a transportable solid selected from the group consisting of chunks, pucks, carrots, stripes, pellets, granules, powder, flakes and combinations thereof.

As embodied and broadly described, the invention also provides a process for extruding a thin positive electrode sheet having at least 40%/wt solid content for a lithium polymer battery through a single or twin screw extruder, said process comprises the steps of:
(a) introducing a pre-mix of positive electrode material in solid form comprising a polymer and solid particles of electrochemically active cathode material, into a first feed throat of the extruder;
(b) melting the polymer and mixing said pre-mix of positive electrode material in the extruder;
(c) introducing in a second feed throat of the extruder an alkali metal salt which is dissolved in the polymer of the pre-mix of positive electrode material; and
(d) extruding the positive electrode material through a die in the form of a thin sheet.

As embodied and broadly described, the invention also provides a process for extruding a thin positive electrode sheet having at least 40%/wt of solid content for a lithium polymer battery through a single or twin screw extruder, the process comprises the steps of:
(a) introducing into a first feed throat of the extruder an alkali metal salt;
(b) introducing into a second feed throat of the extruder a pre-mix of positive electrode material in solid form comprising a polymer and solid particles of electrochemically active cathode material;
(c) melting and mixing said pre-mix of positive electrode material in the extruder and dissolving said alkali metal salt in the melted polymer; and
(d) extruding the positive electrode material through a die in the form of a thin sheet.

As embodied and broadly described, the invention also provides a process for extruding a thin positive electrode sheet having at least 40%/wt of solid content for a lithium polymer battery through a single or twin screw extruder, the process comprises the steps of:
(a) introducing a pre-mix of positive electrode material in solid form comprising a polymer, an alkali metal salt and solid particles of electrochemically active cathode material and electronically conductive additives, into a first feed throat of the extruder;
(b) melting the polymer and mixing said pre-mix of positive electrode material in the extruder; and
(c) extruding the positive electrode material through a die in the form of a thin sheet.

As embodied and broadly described, the invention also provides a process for making a positive electrode having at least 40%/wt of solid content for a lithium polymer battery, the process comprising the steps of:
(a) In a mixing device, mixing together a polymer, a solvent, and solid particles of electrochemically active material to form a mixture of polymer-solid particles;
(b) evaporating the solvent present in the mixture of polymer-solid particles;
(c) introducing the mixture of polymer-solid particles into a first feed throat of the extruder;
(d) melting and blending said mixture of polymer-solid particles in the extruder to form a positive electrode material; and
(e) extruding the positive electrode material through a die in the form of a thin sheet.

As embodied and broadly described, the invention further provides an electrochemical generator having a electrode thin film obtained by the process of extruding pre-mix positive electrode material.

BRIEF DESCRIPTION OF THE DRAWINGS

The invention will be better understood and other advantages will appear by means of the following description and the following drawings in which.

DETAILED DESCRIPTION OF THE INVENTION

Figure 1:
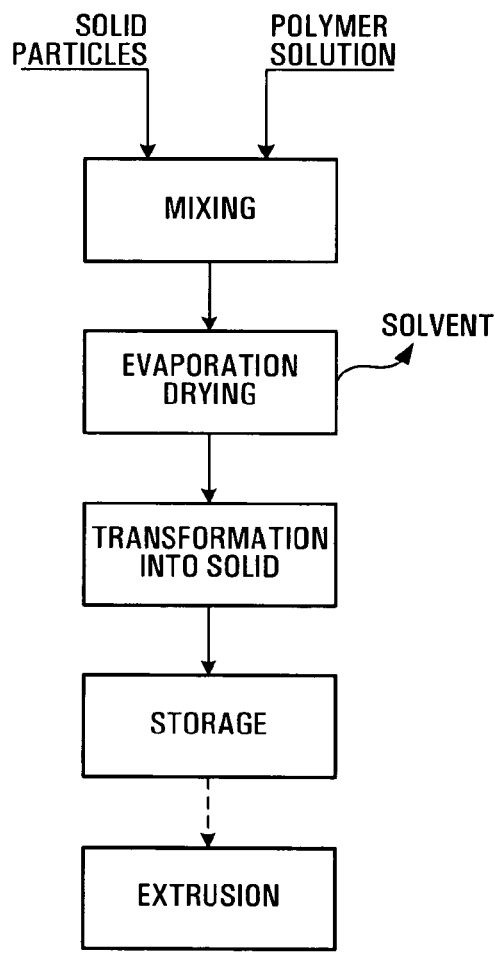
FIG. 1 is a flow chart illustrating the various step for preparing the cathode material according to one embodiment of the invention.

With reference to FIG. 1, a solution of polymer in solvent or mixture of solvents is mixed with solid particles of active cathode material and electronic conductive additives. The polymer solution could be obtained by the dissolution of a polymer in a solvent(s) or directly at the outlet of a polymerization reactor if the polymer is already in solution. In a preferred embodiment the active cathode material and electronic conductive additives have been blended together prior to introduction into the polymer solution. However, the active cathode material and the electronic conductive additives may be introduced separately into the polymer solution. The polymer solution and the solid particles are mixed in any type of mixing device(s) capable of proper dispersion for a sufficient time to obtain a good dispersion of the solid particles in the polymer solution and/or in any equipment that homogenize the mixture in order to achieve the same dispersion. The mixing process may be done in one step in a single mixing device or through multiple steps through a two or more mixing device with different mixing properties. Further solvent may be added if necessary to the mixture to facilitate the dispersion of the solid particles. Solvent typically used in this process are polar or non-polar solvents into which the polymer is soluble such as Toluene, Acetonitrile, Methanol, Acetone, Benzene, and Methyl Ethyl Ketone (MEK) to name a few. The polymer may be an homo- or co-polymer, may comprise two or more polymers, and may be cross linkable or not. Anti-oxidants and other additives such as stabilizers, dispersion agents and fillers may be added to the polymer solution as necessary.

Thereafter, the solvent or solvents are evaporated by any means known to those skilled in the art such as an evaporator or spray dryer amongst others, to obtain a polymer-solid particles mixture adapted for a coating process or an extrusion process. The polymer-solid particles mixture is then transformed into a transportable solid such as small or medium size chunks, carrots pucks or stripes, or granules, powder, pellets or flakes. There are no limitation to the geometric shapes the polymer-solid particles mixture may take. In one specific embodiment, the polymer-solid particles mixture is introduced in a melting and pumping device such as extruder, where the polymer is melted and the composite is further mixed, then pumped into a cooling device where it hardens. This hardened mixture is brought to a mechanical cutting device that transforms the hardened polymer-solid particles mixture into the desired shape such as a pelletizer which transforms the hardened polymer-solid particles mixture into pellets of a few millimeters in length and width or diameter. In another embodiment the polymer-solid particles mixture still in solution in the solvent is spay dried through a nozzle which yields a polymer-solid particles mixture in the form of granules, powder or flakes. The pre-mix cathode material in chunks, carrots, pucks, granules, pellets or powder form is then ready for shipment or for processing by extrusion or coating to be transformed into thin films. In the present text the term solid transportable form includes solids of any shapes which can be safely shipped in containers such as chunks, pucks, carrots, stripes, pellets, granules, powder and flakes.

Preferably, the pre-mix cathode material in transportable solid form is stored and/or transported in a controlled environment. Specifically, it is preferable to maintain the temperature of the pre-mix cathode material in transportable solid form below 30.degree. C. to prevent unwanted degradation of the performance of the cathode material.

In the extrusion process, the pre-mixed cathode material is introduced in a first feed throat of either a single (reciprocating or non-reciprocating) or twin screw extruder where it begins to melt. In a second feed throat downstream from the first feed throat is added an alkali metal salt which is dissolved and mixed in the melted cathode material. As a variant of the process, the alkali metal salt may be introduced first and the pre-mix cathode material second. The alkali metal salt provides ionic conductivity to the cathode material. The cathode material including the dissolved alkali metal salt is extruded through a die as a thin sheet of between 5 and 200 µm thick, either directly onto a substrate support such as a metal foil current collector or a plastic film, or as a self-supporting sheet which is later on laminated onto a current collector. The alkali metal salt(s) may be for example salts based on lithium trifluorosulfonimide (LiTFSi) as described in U.S. Pat. No. 4,505,997, $LiPF_6$, $LiBF_4$, $LiSO_3CF_3$, $LiCLO_4$, and LiSCN, etc. and combination thereof. The nature of the salt is not a limitation of the present invention.

In the extruder, the pre-mixed solid particles (active material and electronic conduction additive particles) are further mixed and blended and are therefore thoroughly mixed and dispersed resulting in an homogenous positive electrode material having a optimal energy content and excellent electrochemical performance or improved cyclability of the electrochemical cells produced thereafter. In addition, the fact that the cathode material has been previously mixed and blended allows the use of an extruder having a screw designed to produce low shear as opposed to the high shear previously required to thoroughly mix and blend the cathode material. This results in a less energetic mixing and melting of the polymer that avoids potential degradation of the polymer with the result of improving the electrochemical performance of the electrochemical cells produced thereafter during the cycles of charge and discharge. The pre-mixing of the solid particles into a polymer solution also enables an increased proportion of solid particles and specifically of active material into the resulting cathode which may contain up to 80%/wt of active material.

The polymer included in the pre-mixed cathode material in solid form may comprise a small amount of water such as between 1000 ppm and 10,000 ppm and preferably within the range of 2000 ppm to 5000 ppm, in order to adjust the theological properties of the pre-mixed cathode material, for example, by lowering the viscosity of the material and therefore improving the processability the pre-mixed cathode material through an extruder.

Figure 2:
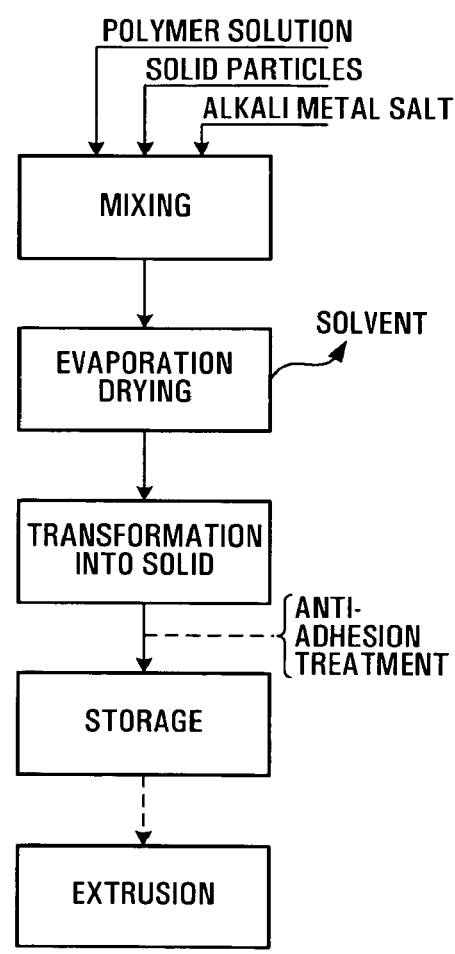
FIG. 2 is a flow chart illustrating the various step for preparing the cathode material according to a second embodiment of the invention.

FIG. 2 illustrates a variant of the process previously described where the polymer solution is prepared with a polar solvent into which both the polymer and the alkali metal salt are soluble as is well known in the art. Polar solvents typically used in this process are Acetonitrile, Methanol, Acetone, and Methyl Ethyl Ketone (MEK) to name a few. To this polymer solution is added all solid particles of active cathode material and electronic conductive additives already pre-blended together and a alkali metal salt soluble in the polar solvent. The mixture of polymer-salt and solid particles is mixed in any type of mixing device(s) or homogenizer capable of proper dispersion for a sufficient time to obtain a good dispersion of the solid particles in the polymer-salt solution. Thereafter the solvent is removed through evaporation or other means from the mixture, and the remaining polymer-salt/solid particles mixture is transformed into a transportable solid such as small to medium size chunks pucks, carrots, stripes, granules, powder, pellets or flakes as previously described. If necessary, to prevent the transportable solid pre-mix cathode material which now includes an alkali metal salt from partially melting and agglomerating during transport or storage, rendering it difficult to further process, the transportable solid pre-mix cathode material may be mixed into a substance like fumed silica which is compatible with the electrochemistry of the cells and microscopically separates the transportable solid, especially the pellets, granules, powder or flakes to inhibit their adhesion to each other.

When brought to the extruder, or any types of melting and pumping device, for processing into thin sheets of between 5 and 200 µm thick, the pre-mix polymer-salt/solid particles (active material and electronic conduction additive particles) are further mixed and blended and are therefore thoroughly dispersed resulting in excellent electrochemical performance or improved cyclability of the electrochemical cells produced thereafter. The pre-mixed cathode material in solid form is introduced into a feed throat of either a single (reciprocating or non-reciprocating) or twin screw extruder where it is melted and extruded through a die as a thin sheet of between 5 and 200 µm thick, either directly onto a substrate support such as a metal foil current collector or a plastic film, or as a self-supporting or free-standing sheet which is later on laminated onto a current collector.

The solid particles are therefore thoroughly mixed resulting in an homogenous positive electrode material having a optimal energy content in terms of volume as well as of mass. In addition, as previously stated, the fact that the cathode material has been previously mixed and blended allows the use of an extruder having a screw designed to produce low shear as opposed to the high shear previously required to thoroughly mix and blend the cathode material. This results in a less energetic mixing and melting of the polymer that avoids potential degradation of the polymer with the result of improving the electrochemical performance of the electrochemical cells produced thereafter during the cycles of charge and discharge.

As a further variant of the process described with reference to FIG. 2, the polymer solution is prepared with a solvent or solvent mixture, into which the polymer is soluble but the alkali metal salt is not soluble, such as a non-polar solvent like Toluene or Benzene. To this polymer solution is added all solid particles of active cathode material and electronic conductive additives already pre-blended together and the alkali metal salt. The alkali metal salt is not dissolved but dispersed into the polymer solution. The mixture of polymer, salt and solid particles is mixed in any type of mixing device or devices (one or more) capable of good dispersion for a sufficient time to obtain solid particles and salt particles that are thoroughly dispersed within the polymer solution. Thereafter the solvent is removed through evaporation or other means from the mixture, and the remaining polymer/salt/solid particles mixture is transformed into a transportable solid such as the shapes or forms previously described.

In some cases, and under certain conditions, the alkali metal salt may be dissolved in the non-polar solvent. For example, raising the temperature of the mixture of polymer, salt and solid particles in solution in the non-polar solvent may enable the salt to dissolve in the polymer solution. The mixture of polymer, salt and solid particles in solution in the non-polar solvent may be heated to a temperature of about 40.degree. C. or more during mixing to enable the salt to dissolve in the polymer solution. Also, a combination of two or more solvents, one of which being a non-polar solvent, may enable the salt to dissolve in the polymer solution. Thereafter the solvent(s) is/are removed through evaporation or other means from the mixture, and the remaining polymer/salt/solid particles mixture is transformed into a transportable solid such as the shapes or forms previously described.

When brought to the extruder for processing into thin sheets of between 5 and 200 µm thick, the pre-mix polymer/salt/solid particles (active material and electronic conduction additive particles) are further mixed and blended and are therefore thoroughly mixed and dispersed resulting in excellent electrochemical performance or improved cyclability of the electrochemical cells produced thereafter. The pre-mixed cathode material is introduced in a feed throat of either a single (reciprocating or non-reciprocating) or twin screw extruder where the polymer is melted, the alkali metal salt is dissolved in the polymer and the solid particles are re-dispersed into the polymer-salt solution. The cathode material is extruded through a die as a thin sheet of between 5 and 200 µm thick, either directly onto a substrate support such as a metal foil current collector or a plastic film, or as a self-supporting sheet which is later on laminated onto a current collector.

As a further variant of the process illustrated in FIG. 1, a solution of polymer in solvent is mixed with solid particles of active cathode material only. The mixture of polymer and solid particles of active cathode material is mixed in any type of mixing device(s) capable of good dispersion for a sufficient time to obtain solid particles that are thoroughly dispersed within the polymer solution. Thereafter the solvent is removed through evaporation or other means from the mixture, and the remaining polymer/solid particles of active cathode material mixture is transformed into a transportable solids as previously described. When brought to the extruder for processing into thin sheets of between 5 and 200 µm thick, the pre-mix polymer/solid particles (active material only) in solid form is introduced into a feed throat of the extruder, the alkali metal salt and the electronic conduction additive are fed into other feed throat(s); the various components are mixed and dispersed or dissolved in the molten polymer. The alkali metal salt is dissolved in the polymer and the solid particles (active material and electronic conductive additives) are re-dispersed into the polymer-salt solution. The cathode material is extruded through a die as a thin sheet of between 5 and 200 µm thick, either directly onto a substrate support such as a metal foil current collector or a plastic film, or as a self-supporting sheet which is later on laminated onto a current collector.

As yet another variant of the process illustrated in FIG. 1, a solution of polymer in solvent is mixed with solid particles of electronic conductive additives material only. The mixture of polymer and solid particles of electronic conductive additives is mixed in any type of mixing device(s) capable of good dispersion for a sufficient time to obtain solid particles of electronic conductive additives that are thoroughly dispersed within the polymer solution. Thereafter the solvent is removed through evaporation or other means from the mixture, and the remaining polymer/solid particles of electronic conductive additives mixture is transformed into a transportable solid as previously described. When brought to the extruder for processing into thin sheets of between 5 and 200 µm thick, the pre-mix polymer/solid particles (electronic conductive additives only) in solid transportable form is introduced into a feed throat of the extruder, the alkali metal salt and the active cathode material are fed into other feed throat(s); the various components are mixed and dispersed or dissolved in the molten polymer. The alkali metal salt is dissolved in the polymer and the solid particles (active cathode material and electronic conductive additives) are re-dispersed into the polymer-salt solution. The cathode material is extruded through a die as a thin sheet of between 5 and 200 µm thick, either directly onto a substrate support such as a metal foil current collector or a plastic film, or as a self-supporting sheet which is later on laminated onto a current collector.

For each of the above variants or embodiments described, if the pre-mix cathode material is prepared within the vicinity of the extruder, the solvent or solvents of the solution of the pre-mix cathode material may be evaporated or dried just prior to the introduction of the pre-mix cathode material into the extruder such that the pre-mix cathode material remains in a fluid state and is never transformed into a transportable solid. The pre-mix cathode material is introduced directly into the extruder while still in a fluid state and processed as described in the previous variants or embodiments thereby eliminating the necessity to transform it into a transportable solid.

In a preferred embodiment, the polymer is a polyether such as polyethylene oxide based polymer, the alkali metal salt is a lithium salt such as LiTFSi, the active material is a transition metal oxide such as lithium vanadium oxide ($Li_xV_3O_8$), the electronic conductive additive is carbon black or a binary mixture of carbon black and graphite. The positive electrode material includes between 15%/wt and 45%/wt of polyether; between 40%/wt and 80%/wt of lithiated vanadium oxide; between 1.0%/wt and 5%/wt of Carbon black and Graphite particles and between 2%/wt and 15%/wt of lithium salt. An antioxidant and other additives in minute proportion may also be added to the mixture.

If the transformation of the solid pre-mix cathode material is done by coating process, the process is simplified since most if not all the components of the cathode are already pre-mixed, permitting reduction of mixing time, energy and hardware thereby reducing production cost.

An electrochemical generator comprising a plurality of electrochemical laminates is then constructed; each laminates comprises an anode film which is preferably a lithium metal sheet or a lithium alloy sheet, an electrolyte separator capable of Lithium ion transport, and a cathode thin film obtained by the process of extruding or coating pre-mixed positive electrode materials.

Although the present invention has been described in relation to particular variations thereof, other variations and modifications are contemplated and are within the scope of the present invention. Therefore the present invention is not to be limited by the above description but is defined by the appended claims.

We claim:

1. A process for preparing a pre-mix positive electrode in transportable solid form for electrochemical cells, the process comprising the steps of:
   (a) in a mixing device, mixing together a polyether comprising between 1000 ppm and 10000 ppm of water, at least one solvent, a lithium salt and solid particles of electrochemically active material to form a mixture of polyether-salt-solid particles;
   (b) evaporating the at least one solvent present in the mixture of polyether-salt-solid particles to obtain a dried polyether-salt-solid particles mixture;
   (c) melting the dried polyether-salt-solid particles mixture through a melting and pumping device, thereafter cooling and hardening the melted polyether-salt-solid particles mixture and breaking down the hardened polyether-salt-solid particles mixture into a transportable solid shape selected from the group consisting of chunks, pucks, carrots, stripes, pellets, granules, powder, flakes and combinations thereof through a mechanical cutting device thereby forming transportable solids; and
   (d) mixing fumed silica which is compatible with the electrochemistry of electrochemical cells with the pre-mix positive electrode in transportable solid form resulting from step (c) to inhibit adhesion of the transportable solids during transport or storage.

2. A process as defined in claim 1, wherein the at least one solvent is a polar solvent.

3. A process as defined in claim 1, wherein the at least one solvent is a non-polar solvent.

4. A process as defined in claim 3, wherein the polyether, the non-polar solvent, the lithium salt and the solid particles of electrochemically active material are heated to a temperature of 40° C. or more while being mixed together in step (a).

5. A process as defined in claim 1, wherein an electronic conductive additive selected from the group consisting of carbon, graphite and combinations thereof is introduced in the mixing device in step (a).

6. A process for preparing a pre-mix positive electrode in transportable solid form for electrochemical cells, the process comprising the steps of:
   (a) in a mixing device, mixing together a polyether comprising between 1000 ppm and 10000 ppm of water, at least one solvent, a lithium salt and solid particles of electrochemically active material to form a mixture of polyether-salt-solid particles;
   (b) spray drying the polyether-salt-solid particles mixture still in solution in the at least one solvent through a nozzle thereby yielding a pre-mix positive electrode in transportable solid form selected from the group consisting of granules, powder and flakes thereby forming transportable solids; and
   (c) mixing fumed silica which is compatible with the electrochemistry of electrochemical cells with the pre-mix positive electrode in transportable solid form resulting from step (b) to inhibit adhesion of the transportable solids during transport or storage.

* * * * *